128,321

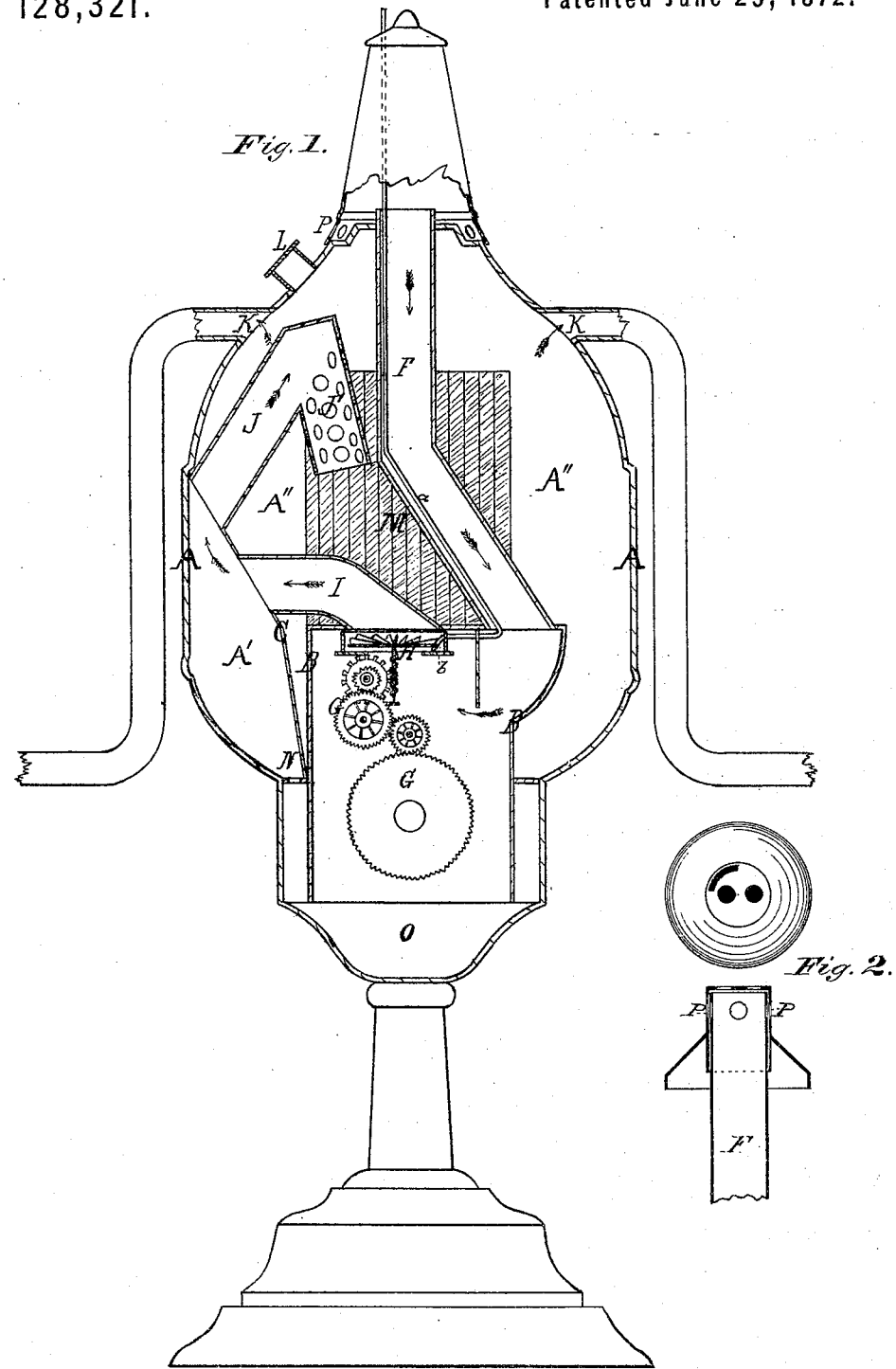

UNITED STATES PATENT OFFICE.

HENRY B. MYER, OF PHILADELPHIA, PENNSYLVANIA.

IMPROVEMENT IN APPARATUS FOR THE MANUFACTURE OF ILLUMINATING-GAS.

Specification forming part of Letters Patent No. 128,321, dated June 25, 1872.

*To all whom it may concern:*

Be it known that I, HENRY B. MYER, of the city and county of Philadelphia, in the State of Pennsylvania, have invented a new and useful Improvement in the Construction of Apparatus for Making Gas from Gasoline, &c.; and I do hereby declare the following to be a full, clear, and exact description of the same, reference being had to the accompanying drawing which forms a part of this specification, and which represents a vertical section of my improvement as applied to a portable illuminator.

In the drawing, Figure 1 is a vertical section, and Fig. 2 a plan and section of the top of the machine.

My improvement consists in combining, with an inclosed reservoir of gasoline, &c., a series of carbureters, a revolving fan, and a clock-work mechanism.

A A is a hollow exterior casing, made of sheet metal, containing the several parts of my improvement, as hereinafter described. The interior of this casing is subdivided into the gasoline-chamber, an air-chamber, and a drip-chamber. The air-chamber and gasoline-chamber are formed as follows: The air-chamber is a tight metallic box, shown in section by the line B B, and contains the machinery for revolving the fan. C is a rim separating the space A' from the space A''. The upper space A'', inclosed above the rim C, and exterior to the air-chamber, is the gasoline-chamber, which contains the gasoline, &c. The tube F is open to the exterior air above, and descends through the top of the air-chamber, and conveys the exterior air to the air-chamber and fan. G G are a series of clock-work wheels which revolve a series of inclined wings, H. These wings revolve within a rim or casing which connects with the tube I. The air received by the tube F is conveyed to the interior of the fan H, and by it is forced through the tube I into the receptacle A', from whence it passes up through the tube J J', and discharges into the gasoline-chamber A''. The air, after being saturated with gasoline-vapor, escapes through the tube K, to which is attached any ordinary burner. (I prefer an Argand burner.) L is a tube, with screw-cap, for supplying gasoline to the chamber A''. The tube J J' is perforated so as to enable the air to escape readily. In the gasoline-chamber A'' I place a series of wire frames, M, with cotton-wicking loosely wound upon them, to absorb the gasoline, and furnish, at all times, an extended surface of contact between the air and the gasoline, for the purpose of more readily carbureting the air. For the purpose of stopping the clock-mechanism and fan, a lever, a, with catch b, extends down the pipe F, the handle projecting at the top, as shown. By pulling up this lever the fan is stopped. When the machine is not running, to prevent the gasoline from evaporating, the cap P P, over the tube F, is turned, so as to close the air-inlet holes. The stop mechanism shown is convenient; but it is evident it may be placed in other positions so as to accomplish the same result—viz., to stop the fan when the machine is not in use. The number and shape of these carbureters may be varied to correspond with the interior shape of the gasoline-chamber. They should extend from the bottom to near the top of the chamber, so that, as the liquid gasoline descends by reason of its consumption, capillary attraction will cause the gasoline to be always maintained throughout the carbureters, and so secure a uniform surface of contact, as above described, at all times. The clock-work is driven by a helical spring, and its speed is regulated by the fan itself.

The operation is as follows: The air enters through a series of apertures at P, and passes down the tube F into the air and fan chamber, and then enters into the interior of the fan H, and is forced up through the tube I into the receptacle A', and thence, through J J', into the gasoline-chamber A'', where it is saturated with the vapor of gasoline, and from whence it escapes through the tube K, to which the burner is attached.

Thus I produce, within a compact space, a gasoline or carbureter chamber so arranged with connecting-tubes that, by winding up the clock-work, a constant supply of gas may be formed at the place where it is consumed. The bulk of the entire apparatus is such that it may be used for a portable stand-illuminator, or a chandelier, or a bracket-illuminator; and the gasoline is so inclosed and separated that no access of flame can possibly take place. No heat is required, and therefore no explosion can take place.

The drip-chamber A' is so arranged that if the apparatus should be so shaken or tilted that the gasoline would run back through the tube J J' it would drop into the bottom of the space A', and descend, through holes at N, into the space O, and could there escape without doing any harm.

Having thus described my invention, what I claim as my invention, and desire to secure by Letters Patent of the United States, is—

1. The arrangement of the gasoline-chamber and the air-chamber, substantially as described.

2. The construction of the clock-work mechanism, the fan, the stop mechanism, and the gasoline or carbureter chamber, for the purpose described.

3. The combination of the clock-work mechanism, the fan, the air-chamber, the gasoline-chamber, and the tube leading to the air-chamber, and the tubes leading to the gasoline-chamber from the air-chamber, as described.

4. The arrangement of the drip-chamber A', substantially as described.

HENRY B. MYER.

Witnesses:
WM. R. WRIGHT,
THOS. A. BURTT.